United States Patent [19]
Winkler et al.

[11] 3,987,469
[45] Oct. 19, 1976

[54] MINIATURE STILL CAMERA WITH EXPANSIBLE HOUSING

[75] Inventors: Alfred Winkler, Munich; Dieter Engelsmann, Unterhaching; Rolf Schröder, Baldham; Dieter Maas, Munich, all of Germany

[73] Assignee: AGFA-Gevaert, A.G., Leverkusen, Germany

[22] Filed: July 31, 1974

[21] Appl. No.: 493,462

[30] Foreign Application Priority Data
Aug. 11, 1973 Germany............................ 2340786

[52] U.S. Cl................................ 354/187; 354/212; 354/288
[51] Int. Cl.²......................................... G03B 17/04
[58] Field of Search ............ 354/187, 191, 212, 288

[56] References Cited
UNITED STATES PATENTS

| | | | |
|---|---|---|---|
| 3,672,276 | 6/1972 | Erlichman........................ | 354/288 X |
| 3,864,705 | 2/1975 | Winkler........................... | 354/212 X |

Primary Examiner—L. T. Hix
Assistant Examiner—E. M. O'Connor
Attorney, Agent, or Firm—Michael J. Striker

[57] ABSTRACT

A miniature still camera wherein a brick-shaped main section of the housing supports and guides an L-shaped second section the longer leg of which is parallel to and located in front of the elongated front side of the main section and the shorter leg of which is parallel to a shorter second side of the main section. The second section is reciprocable between a first position in which its longer leg conceals a picture taking lens which is recessed into the front side of the main section and the shorter leg conceals a view finder in the main section, and a second position in which the lens and the view finder are exposed and the camera is ready to take pictures. The second section cocks the shutter and/or actuates the film transporting mechanism during movement between its first and second positions and is biased to its second position by a helical spring which reacts against a lug of the main section and bears against an eyelet of the second section. The lug and eyelet surround an elongated guide rod which is mounted in the second section adjacent to and in parallelism with the longer leg. The shorter leg of the second section has a tongue which extends into and is guided by a groove in the rear wall of the main section.

9 Claims, 1 Drawing Figure

U.S. Patent     Oct. 19, 1976     3,987,469
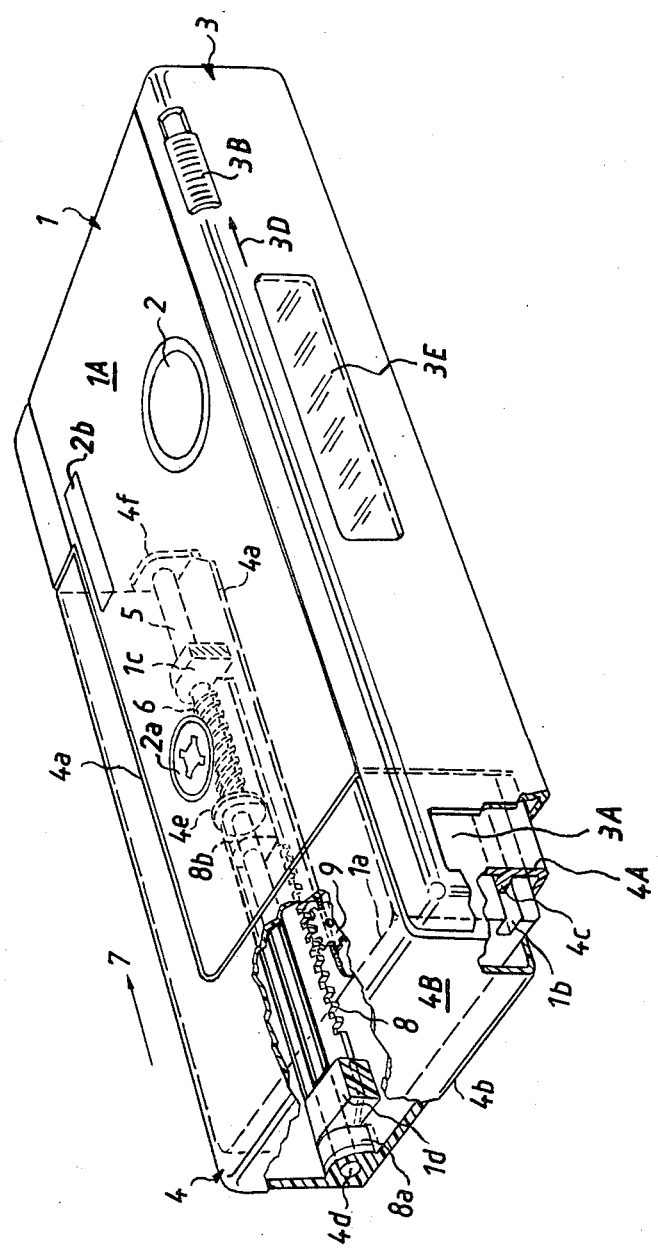

MINIATURE STILL CAMERA WITH EXPANSIBLE HOUSING

CROSS-REFERENCE TO RELATED APPLICATION

The camera of the present invention constitutes an improvement over and a further development of the camera which is disclosed in the commonly owned copending application Ser. No. 344,366 filed Mar. 23, 1973 by Alfred Winkler for "Photographic apparatus with expansible housing" now U.S. Pat. No. 3,864,705 granted Feb. 4, 1975.

BACKGROUND OF THE INVENTION

The present invention relates to improvements in photographic apparatus with expansible housings, especially to improvements in still cameras with relatively small (so-called pocket sized) expansible housings.

U.S. Pat. No. 3,864,705 to Winkler discloses a still camera having a substantially brick-shaped housing including two sections one of which is movable with respect to the other between a first position in which the picture taking lens and the view finder are concealed and a second position in which the lens and the view finder are exposed. Furthermore, the movement of one section relative to the other section results in an automatic transport of film by the length of a frame and/or in cocking of the shutter.

SUMMARY OF THE INVENTION

An object of the invention is to provide a novel and improved extensible housing for miniature still cameras wherein the housing sections are held against tilting and other stray movement relative to each other.

Another object of the invention is to provide novel and improved guide means for the sections of the expansible housing and novel and improved means for reducing friction between the sections.

A further object of the invention is to provide a brick-shaped miniature still camera which can be manipulated by unskilled or careless persons without any or with minimal danger of jamming during movement of the housing sections relative to each other.

An additional object of the invention is to provide a novel and improved mounting for actuating means which moves one or more components of one or more camera units in one housing section in response to movement of the one housing section relative to the other section or vice versa, especially one or more components of the shutter and/or film transporting mechanism in the camera.

The invention is embodied in a photographic apparatus, especially in a miniature still camera, which comprises a housing including a first or main section having a relatively long first or front side and a relatively short second side which is adjacent to the first side and preferably makes with the first side an angle of substantially 90 degrees, and a substantially L-shaped hollow second section. The second section has a first leg which is adjacent to the first side and a second leg which is substantially or exactly parallel to the second side of the first section. The second section is movable between spaced-apart first and second positions in which one of the sections (preferably the second section) respectively conceals and exposes a part of the other section. The second section is preferably reciprocable in parallelism with the first side of the first section, and the aforementioned part of the first section which is concealed by the second section when the latter assumes its first position includes that portion of the first section which is adjacent to the second side of the first section and which preferably contains a view finder. The aforementioned part of the first section preferably further includes that portion of the first side which surrounds a recessed picture taking lens.

The means for guiding the second section during movement with respect to the first section preferably comprises a composite guide means including elongated first guide means adjacent to and parallel to the first leg of the second section and second guide means having portions provided on the first section and on the second leg of the second section and extending in parallelism with the first guide means.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE is a perspective view of a still camera which embodies the invention, with portions of the two housing sections broken away.

DESCRIPTION OF THE PREFERRED EMBODIMENTS

The still camera which is shown in the drawing has a miniature brick-shaped housing including a first or main section 1 and a hollow L-shaped second section or slide 4. The front wall of the first section 1 carries the mount for a picture taking lens (not shown) which is recessed into the front side of the section 1 and is concealed when the section 4 assumes a first end position shown in the drawing. The section 4 then also conceals a view finder (not shown) which is mounted in the section 1 and is accessible to the eye when the section 4 is shifted to a second end position by moving in a direction to the left, as viewed in the drawing. An opening 3A in a pivotable door 3 at the rear side of the section 1 is in register with the view finder, and the section 4 has a rear wall 4A which is located in front of the opening 3A when the section 4 assumes the position shown in the drawing. The door 3 is normally held in the illustrated closed position by a locking device 3B which can be shifted in a direction to the right (see the arrow 3D) to thus allow the door to pivot to an open position in which the user can gain access to a cassette in an internal chamber of the section 1 or in which the user can insert a fresh cassette. A window 3E in the door 3 allows for observation of numerals on the backing strip for photographic film in a properly inserted cassette; such numerals indicate the total number of exposed or unexposed film frames.

The top wall 1A of the main housing section 1 supports a deformable membrane 2 which forms part of a camera release, an indexible socket 2a which can receive the foot of a multiple flash lamp holder of the type known as Flashcube or Magicube (both trademarks), and a shutter adjusting device 2b which can set the shutter for the making of exposures in sunny weather, in cloudy weather or with flash. It is clear that the camera can include a more sophisticated shutter which can furnish a large number of different exposure times. The camera may further comprise an automatic exposure control which can adjust the diaphragm (not shown) so that the size of the aperture is a function of scene brightness.

That end portion of the main section 1 which is concealed when the section 4 is held in the illustrated first end position is indicated at 1a. This end portion contains the view finder. The section 4 can also overlie the picture taking lens in the front wall of the main section 1 as well as the front lens of the view finder in the end portion 1a. The section 4 preferably further serves as a means for actuating the film transporting mechanism and the shutter in the main housing section 1. Still further, the section 4 can be used to index the socket 2b whenever it moves in or counter to the direction indicated by an arrow 7. The arrangement may be such that the film is transported by the length of a frame and that the shutter is cocked in automatic response to movement of the section 4 from the illustrated first end position to its second end position. Such movement of the section 4 takes place under the action of a helical spring 6 which reacts against the section 1 and bears against the section 4 to urge the latter in a direction counter to that indicated by the arrow 7. When the user completes a first exposure and wishes to make a second exposure, the section 1 is held with one hand and the section 4 is pushed in the direction of arrow 7 with the other hand so that it moves to the position which is shown in the drawing. The section 4 is thereupon released, or the pressure upon this section is relaxed, so that the spring 6 is free to expand and returns the section 4 to the second end position. Such movement of the section 4 results in indexing of the socket 2b, in transport of the film by the length of a frame, and in cocking of the shutter. The user then makes an exposure by deforming the membrane 2 and again proceeds as described above prior to the making of a third exposure.

The camera is further provided with suitable holding means or detent means and with actuating means for the detent means, preferably of the type disclosed in U.S. Pat. No. 3,864,705 to Winkler. The detent means can hold the section 4 in the position which is shown in the drawing whereby the section 4 conceals and protects the picture taking lens and the view finder and reduces the length of the housing so that the camera can be stored in a small carrying case, inserted into a small pocket, or placed into a handbag to occupy a minimum of space. The actuating means has a first position of rest in which the detent means is ineffective so that the spring 6 is free to immediately return the section 4 to its second position as soon as the user's hand relaxes the pressure upon the section 4, and a second position of rest in which the detent means is effective and automatically retains the section 4 as soon as the latter is moved to the illustrated position.

In accordance with a feature of the invention, the section 4 is constructed and configurated in such a way that it can perform a number of functions including the aforementioned concealment of sensitive camera units in the housing, indexing of the socket 2b, cocking of the shutter, and actuation of the film transporting mechanism. In addition, the section 4 is designed with a view to insure that it cannot jam in the one or the other end position and/or in an intermediate position, that it can fully and reliably conceal the sensitive camera units, as well as that it allows for a substantial reduction in the overall dimensions (particularly length) of the housing when it is moved to and held in the illustrated position. Still further, the section 4 should not wobble with respect to the section 1, it should invariably assume a predetermined second end position when the spring 6 is allowed to dissipate energy, and it should be mounted in such a way that the movement thereof against the opposition of the spring 6 necessitates the exertion of a relatively small force, i.e., of a force only slightly exceeding that force which is required to overcome the bias of the spring 6. This is achieved by utilizing a substantially L-shaped second section 4 including a longer first portion or leg 4a which is movable in front of the front wall of the section 1 and picture taking lens in the front wall, and a shorter second portion or leg 4b which can conceal the view finder in the end portion 1a and can be grasped by hand to move the section 4 against the resistance of the spring 6. As shown, the leg 4a extends in front of a long side of the section 1 and the leg 4b is parallel to a short side which is adjacent to the long side. However, whereas the leg 4a is movable in parallelism with the adjacent front side of the section 1, the outer wall 4B of the leg 4b is movable toward and away from the respective short side of the section 1.

The just described configuration of the section 4 enables the latter to be properly held against tilting and/or other stray movements (i.e., against jamming) because the relatively long leg 4a can be guided by the section 1 in each and every position of the section 4 whereby a substantial portion of the leg 4a remains adjacent to and can be guided by the section 1 even if the section 4 is moved all the way to its second end position in which the view finder in the portion 1a of the main section 1 is fully exposed. In the illustrated embodiment, the means for guiding the section 4 comprises an elongated rod-like guide member 5 which is mounted in the section 4 and is adjacent to and parallel with the longer leg 4a. One end of the rod 5 is adjacent to that end portion of the shorter leg 4b which is integral with the left-hand end portion of the leg 4a, and the sections 1, 4 preferably comprise additional guide means which are adjacent to the other end portion of the leg 4b, i.e., close to the door 3 on the main section 1. This second guide means comprises an elongated projection or tongue 4c on the leg 4b and a matching groove or recess 1b in the main section 1. The combination of the two guide means insures that the section 4 cannot be tilted with respect to the section 1, even if the section 4 is moved by an unskilled or careless person. Also, such guide means insure that the section 4 cannot turn on the rod 5 and/or that the tongue 4c cannot leave the groove 1b. It will be seen that the composite guide means 5, 4c, 1b prevents a tilting of the section 1 or 4 from the general plane of the camera housing, either at right angles to the plane of the door 3 or in directions at right angles to the upper side of the section 1 or 4.

The sections 1 and 4 may but need not consist of a synthetic plastic material. For example, the section 1 may consist of a plastic material and the section 4 may consist of a corrosion-resistant metal. If the section 1 consists of a plastic material, the tongue 4c is preferably an integral or separable part of the section 4, but it is equally within the purview of the invention to provide the tongue on the section 1, to provide each of the sections 1, 4 with a tongue and a groove, or to provide one of the sections 1, 4 with two or more tongues and the other section with a corresponding number of grooves. The length of the tongue 4c may be of a small fraction of the length of the groove 1b or vice versa, as long as the tongue invariably extends into a portion of the groove or as long as the groove invariably receives a portion of the tongue in each position of the section 1 relative to the section 4 or vice versa.

In the illustrated embodiment, the lower portion of the leg 4a carries at its inside three longitudinally spaced eyelets 4d, 4e, 4f having registering openings which receive the guide rod 5. The main section 1 has two eyelets or lugs 1c, 1d which are respectively disposed between the eyelets 4e, 4f and 4d, 4e and whose openings register with those of the eyelets 4d-4f. The guide rod 5 is inserted into the registering openings of the eyelets 4d-4f and 1c-1d after the eyelets 4d-4f are moved into register with the eyelets 1c, 1d, and the rod is thereupon affixed to the section 4. For example, the left-hand end of the rod 5 can be bonded to the wall 4B of the leg 4b.

The spring 6 surrounds the rod 5 between the eyelets 1c, 4e so that it reacts against the section 1 (via eyelet 1c) and bears against the section 4 (via eyelet 4e) to thereby urge the section 4 to the second end position in which the wall 4B is spaced apart from the end portion 1a.

The guide rod 5 may further serve as a means for actuating the film transporting mechanism and/or the shutter in the main section 1 or as a means for supporting such actuating means. The film transporting mechanism includes a pinion 9 in the section 1 and the actuating means for the film transporting mechanism comprises a toother rack 8 which shares the movements of the section 4 and is parallel to the leg 4a and guide rod 5. The rack 8 may consist of a suitable synthetic plastic material and has two eyelets 8a, 8b through which the rod 5 extends. The eyelet 8a is located between the eyelets 1d, 4d, and the eyelet 8b is adjacent to the eyelet 4c. When the section 4 is moved by the spring 6, the rack 8 moves with the section 4 because the eyelet 8b is pushed by the eyelet 4e and the eyelet 8a is free to move away from the eyelet 1d. When the user thereupon moves the section 4 in the direction indicated by the arrow 7, the rack 8 moves with the section 4 because its eyelet 8a is pushed by the eyelet 4d. The section 4 comes to a halt in the position which is shown in the drawing when the eyelet 8a strikes against the eyelet 1d of the section 1. The second end position of the section 4 is determined by the eyelet 4f which then abuts against the eyelet 1c of the section 1.

The improved camera is susceptible of many additional modifications. For example, the guide rod 5 can be replaced by guide means including a tongue on the leg 4a and a groove in the front wall of the section 1 or vice versa. Also, the section 4 could carry one or more roller followers or spherical followers running along a track in the section 1. Still further, the helical spring 6 could be replaced by a spring or a package of springs which react against the right-hand end wall of the section 1 and bear against the eyelet 4f or against another portion of the section 4.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In a photographic apparatus, particularly in a still camera, a combination comprising a housing including a first section having a relatively long first side and a relatively short second side adjacent to said first side, and a substantially L-shaped second section having a first leg adjacent to said first side and a second leg substantially parallel to said second side of said first section, said second section being reciprocable relative to said first section in parallelism with said first side of said first section between spaced apart first and second positions in which one of said sections respectively conceals and exposes a part of the other of said sections; means for guiding said second section during movement relative to said first section, including first guide means adjacent to and parallel to said first side of said first section and second guide means remote from said first side of said first section and parallel to said first guide means, each of said guide means comprising a first portion in said first section and a second portion disposed in said second section and slidable along said first portion, said second portion of one of said guide means having an elongated rod parallel to said first leg and said first portion of said one guide means comprising at least one eyelet through which said rod extends; film transporting means in said first section; and means for actuating said film transportation means, comprising a member secured to and movable with said rod.

2. A combination as defined in claim 1, wherein said means for actuating said film transporting means operates in response to movement of said second section between said first and second positions thereof.

3. A combination as defined in claim 1, wherein said second section further comprises at least one second eyelet surrounding said rod and spaced apart from said one eyelet, and further comprising means for biasing said second section to second position including a resilient element reacting against said one eyelet and bearing against said second eyelet.

4. In a photographic apparatus, particularly in a still camera, a combination comprising a housing including a first section having a relatively long first side and a relatively short second side adjacent to said first side, and a substantially L-shaped second section having a first leg adjecent to said first side and a second leg substantially parallel to said second side of said first section, said second section being reciprocable relative to said first section in parallelism with said first side of said first section between spaced apart first and second positions in which one of said sections respectively conceals and exposes a part of the other of said sections; means for guiding said second section during movement relative to said first section, including first guide means adjacent to and parallel to said first side of said first section and second guide means remote from said first side of said first section and parallel to said first guide means, each of said guide means comprising a first portion in said first section and a second portion disposed in said second section and slidable along said first portion, one of said portions of one of said guide means having an elongated rod parallel to said first leg and the other of said portion of said guide means comprising at least one eyelet through which said rod extends; film transporting means in said first section; and means for actuating said film transporting means, comprising a member movable with said rod and including an elongated toothed rack having eyelets surrounding said rod, said film transporting means comprising at least one gear which meshes with said rack.

5. In a photographic apparatus, particularly in a still camera, a combination comprising a housing including a first section having a relatively long first side and a relatively short second side adjacent to said first side, and a substantially L-shaped second section having a first leg adjacent to said first side and a second leg substantially parallel to said second side of said first section, said second section being reciprocable relative to said first section in parallelism with said first side of said first section between spaced apart first and second positions in which one of said sections respectively conceals and exposes part of the other of said sections; means for guiding said second section during movement relative to said first section, including first guide means adjacent to and parallel to said first side of said first section and second guide means remote from said first side of said first section and parallel to said first guide means, each of said guide means comprising a first portion in said first section and a second portion disposed in said second section and slidable along said first portion, one of said portions of one of said guide means having an elongated rod parallel to said first leg and the other one of said portions of said one guide means comprising at least one eyelet through which said rod extends; film transporting means in said first section and means for actuating said film transporting means, comprising a member secured to and movable with said rod.

6. In a photographic apparatus, particularly a still camera, a combination comprising a housing including a first section having a relatively long first side and a relatively short second side adjacent to said first side, and a substantially L-shaped second section having a first leg adjacent to said first and a second leg substantially parallel to said second side of said first section, said second section being reciprocable relative to said first section in parallelism with said first side of said first section between spaced apart first and second positions in which one of said sections respectively conceals and exposes part of the other of said sections; means for guiding said second section during movement relative to said first section, including first guide means adjacent to and parallel to said first side of said first section and second guide means remote from said first side of said first section and parallel to said first guide means, each of said guide means comprising a first portion in said first section and a second portion disposed in said second section and slidable along said first portion; film transporting means in said first section; and means for actuating said film transporting means, comprising an elongated toothed rack secured to one of said guide means, said film transporting means comprising at least one gear which meshes with said rack.

7. In a photographic apparatus, particularly in a still camera, a combination comprising a housing including a first section having a relatively long first side and a relatively short second side adjacent to said first side, and a substantially L-shaped second section having a first leg adjacent to said first side and a second leg substantially parallel to said second side of said first section, said second section being reciprocable relative to said first section in parallelism with said first side of said first section between spaced apart first and second positions in which one of said sections respectively conceals and exposes a part of the other of said sections; means for guiding said second section during movement relative to said first section, including first guide means adjacent to and parallel to said first side of said first section and second guide means remote from said first side of said first section and parallel to said first guide means, each of said guide means comprising a first portion in said first section and a second portion disposed in said second section and slidable along said first portion, one of said portions of one of said guide means having an elongated rod parallel to said first leg and the other of said portions of said one guide means comprising at least one eyelet through which said rod extends, and one of said portions of the other of said guide means comprising a tongue whereas the other of said portions of said other guide means has a groove for said tongue; film transporting means in said first section; and means for actuating said film transporting means comprising a member secured to and movable with said rod.

8. In a photographic apparatus, particularly a still camera, a combination comprising a housing including a first section having a relatively long first side and a relatively short second side adjacent to said first side, and a substantially L-shaped second section having a first leg adjacent to said first side and a second leg substantially parallel to said second side of said first section, said second section being reciprocable relative to said first section in parallelism with said first side of said first section between spaced apart first and second positions in which one of said sections respectively conceals and exposes a part of the other of said sections; means for guiding said second section during movement relative to said first section, including first guide means adjacent to and parallel to said first side of said first section and second guide means remote from said first side of said first section and parallel to said first guide means, each of said guide means comprising a first portion in said first section and a second portion disposed in said second section and slidable along said first portion; film transporting means in said first section; and means for actuating said film transporting means, comprising a member secured to and movable with one of said portions of one of said first and second guide means.

9. In a photographic apparatus, particularly in a still camera, a combination comprising a housing including a first section having a relatively long first side and a relatively short second side adjacent to said first side, and a substantially L-shaped second section having a first leg adjacent ot said first side and a second leg substantially parallel to said second side of said first section, said second section being reciprocable relative to said first section in parallelism with said first side of said first section between spaced apart first and second positions in which one of said sections respectively conceals and exposes part of the other of said sections; means for guiding said second section during movement relative to said first section, including first guide means adjacent to and parallel to said first side of said first section and second guide means remote from said first side of said first section and parallel to said first guide means, each of said guide means comprising a first portion in said first section and a second portion disposed in said second section and slidable along said first portion, one of said portions of one of said guide means having an elongated rod parallel to said first leg and the other of said portions of said first one guide means comprising at least one eyelet through which said rod extends; film transporting means in said first section; and means for actuating said film transportation means, comprising a member secured to and movable with said one of said portions of said guide means.

\* \* \* \* \*